United States Patent Office 3,508,374
Patented Apr. 28, 1970

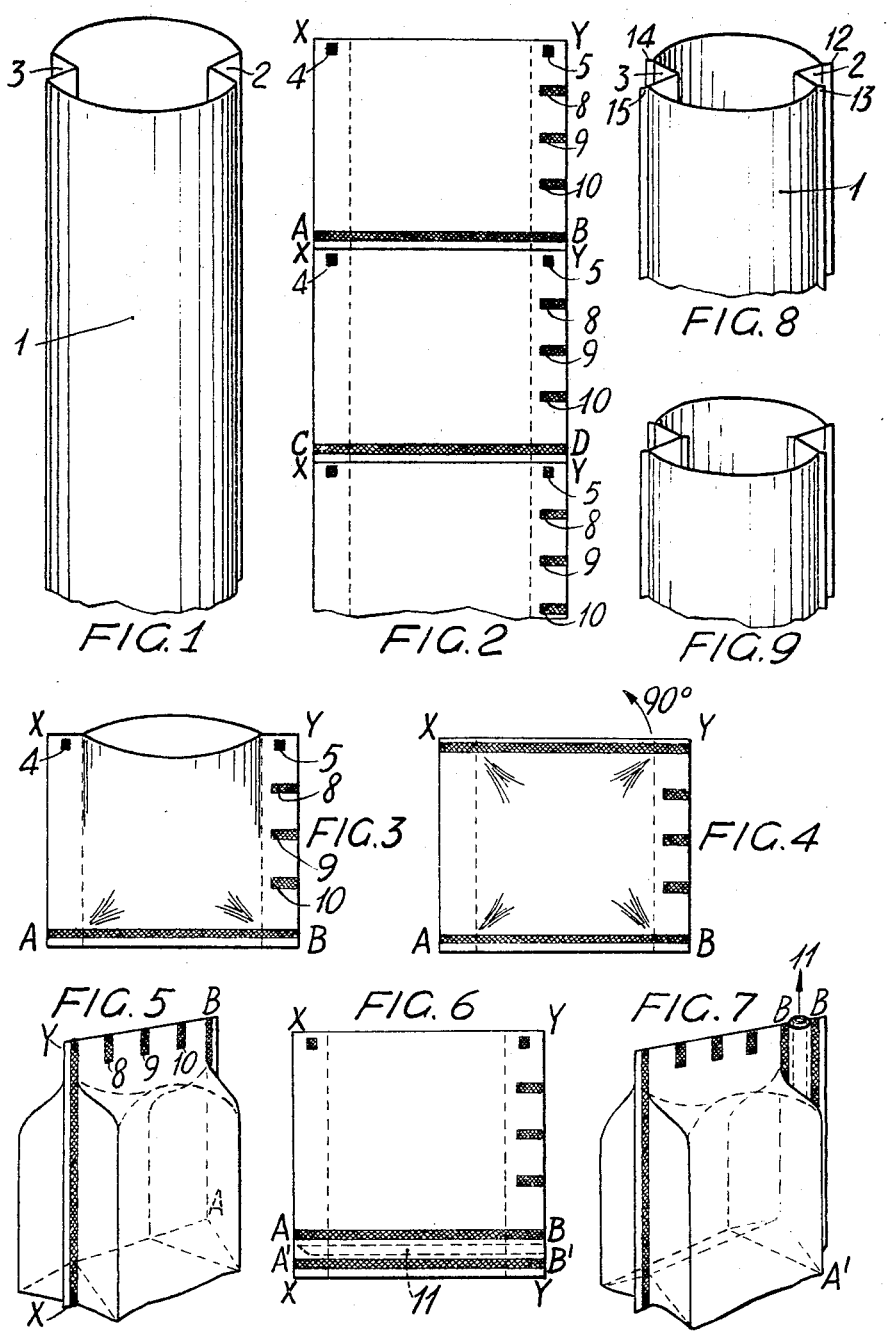

3,508,374
METHOD FOR MANUFACTURING BAGS OF THERMOPLASTIC MATERIAL AND BAG OBTAINED THEREBY
Guido Bertoglio, Lugano-Viganello, Switzerland, assignor to Centra Anstalt, Vaduz, Liechtenstein
Filed Nov. 20, 1967, Ser. No. 684,121
Claims priority, application Switzerland, Nov. 26, 1966, 16,961/66
Int. Cl. B65b *43/08*
U.S. Cl. 53—29                                     5 Claims

ABSTRACT OF THE DISCLOSURE

Bags of thermoplastic material are provided, which will stand upright. A bag blank comprising a tubular member having an inwardly recessing fold is welded along a plurality of transverse lines perpendicular to the fold and then cut off adjacent the welds to form open bags also having welded points at the ends of the open side. The bag is filled and then welded closed, and then rotated 90° so that the recessing fold is lowermost and ensures a stable support for the filled bag.

---

The present invention relates to a process for manufacturing bags of thermoplastic material which, once they are filled up, are adapted to stay in upright, i.e. in vertical position.

It also relates to the bag produced by the aforementioned method.

The process of the invention is characterized by the following operations:

(a) Preparation by extrusion or any other equivalent process of a continuous tubular member of thermoplastic material longitudinally provided with an inwardly recessing fold or with two folds located at diametrally opposed positions.

(b) Introduction of the flattened tubular member into a welding machine effecting: one or more main cross weld seams extending throughout the entire width of the tubular member and intended to form one side of the bag; two edge spot welds at the opening border of the bag and marginal welding sections for uniting the two portions of one of the folds and specifically of that one which is going to form the top of the bag, a cutting device being provided for cutting the tubular member at the required distance from the cross welding seams according to the desired dimensions of the bag.

(c) Filling of the bag and thereafter complete welding of the cut edges defining the opening so as to hermetically close said bag.

(d) Rotating of the bag 90°, putting same upright on the base surface formed by the "side" fold which has not been provided with marginal welding sections, said fold flattening out under the weight of the material contained in the bag, thereby providing for a good support surface i.e. for a base of the bag itself which thus stays in upright position.

The bag obtained with the above mentioned method is therefore characterized by at least a side fold later serving as a support base for the bag which thus stays in upright position.

Two side folds are usually perferred since they permit the flattended out tube to be rolled up more readily for transportation before the manufacturing of the bags is started.

By way of illustration the accompanying drawings diagrammatically show the different operations of the method of the invention.

FIG. 1 is a perspective front view of a section of a continuous tubular member of thermoplastic material as it is delivered by an extrusion head.

FIG. 2 shows the positions of the cross and marginal welds as well as the cutting line for each bag.

FIG. 3 is a view of a bag in its filling phase.

FIG. 4 is a view of the same bag filled up and then closed.

FIG. 5 is a view of same in upright position.

FIG. 6 is a view of a modification according to which there are formed on the bag double parallel welding seams so as to leave a space therebetween which is adapted to receive a pointed straw like member to suck the bag's content, should this last be in a liquid state.

FIG. 7 is a view of the bag of FIG. 6 in upright position.

FIG. 8 is a view of a modification of FIG. 1 according to which, during the extrusion, the edges of the longitudinal folds are reinforced by longitudinal welding lines or by borders.

FIG. 9 is a view of a modification of FIG. 8.

With reference to FIG. 1: the method of the invention is carried into effect by preparing by extrusion or any other equivalent process a continuous tube 1 of thermoplastic material, longitudinally provided with two folds 2 and 3 directed inwards and located in diametrally opposed position.

It is however possible to realize the method of the invention also with a bag having only one fold and specifically fold 3 which is going to form the bottom of the bag.

The flattened tube is thereafter introduced into a non represented machine which affects the various weld seams that will be listed hereinafter as well as the cutting or separating of the various bags.

The weld seams comprise: the main cross welds A–B, C–D, etc. which extend throughout the entire width of the tube and will later form each a side of the bag (FIG. 5) and the secondary weld lines.

The secondary weld lines comprise: the two edge spot welds 4 and 5 (FIG. 2) at the opening border of the bag and the marginal weld sections 8, 9, 10 for uniting the two portions of one of the folds and namely of fold 2 which is going to form the top part B–Y of the bag (see FIGS. 2 and 5).

The same machine is provided with a non represented cutting device cutting the tubular member 1 at the lines X–Y according to the dimensions of the bags to be obtained.

The machine effecting the operation shown in FIG. 2 delivers bags such as the ones illustrated in FIG. 3 which are then filled at their open side X–Y (FIG. 3) with a liquid (milk, drinks, etc.) or with powder, granules or any other kind of material.

The side X–Y is then welded as shown in FIG. 4 and the bag is then turned upwards 90° so as to come to stand upon the side A–X comprising the fold 3, which thereby forms a suitable supporting base. The bag may hence readily and firmly remain in upright, i.e. vertical position.

The method of the invention differs from the conventional ones by the fact that the fold 3 along the side A–X (FIG. 5) serving as a base for the bag is not a fold that has been expressly formed at the bottom of the bag but is an initially made side fold, which means that the bag is readily produced by means of simple cross welding.

In view of this fact the bag, once it has been filled, has to be rotated 90° in order to come to a vertical position.

A modification of the above mentioned method comprises the production of double cross weld lines A–B and A′–B′ (FIGS. 6 and 7), said double lines defining therebetween a longitudinal compartment adapted to receive a pointed straw-like tubular element 11 for instance of hard plastic material which, introduced in said chamber, allows to suck the liquid content of the bag (milk, drink, etc.).

Another modification comprises the reinforcing of the edges of the folds 2 and 3 of the tube 1 by means of longitudinal welding seams 12–13–14–15 (FIG. 8) or of the inner edge of the fold as well, as illustrated in FIG. 9.

Said reinforcing lines could also consist of thickenings produced by the head for the extrusion of the tube or of welded bordering means or the like.

What is claimed is:

1. A method for manufacturing bags of thermoplastic material which when filled will stand upright, starting from a continuous tubular flattened member having an inwardly recessing fold along at least one edge thereof, comprising the steps of welding cross seams across the entire breadth of the tubular flattened band in a direction perpendicular to said fold, welding opposite sides of the tubular member together at locations corresponding to the top of the completed bag and to the bottom corner of the completed bag remote from said cross seam of the bag, cutting off the bag along a line adjacent a said cross seam, filling the bag with the open side opposite said cross seam uppermost, closing the bag, and rotating the bag through 90° until said fold is lowermost and setting the filled bag upright on a supporting surface with said fold lowermost.

2. A method as claimed in claim 1, and forming said bag from a continuous tubular flattened bag having two inwardly recessing folds located at diametrically opposed positions.

3. A method as claimed in claim 1, in which said welding along the top of the bag is performed at a plurality of spaced points.

4. A method as claimed in claim 1, and forming the bag from a tubular band whose said fold has reinforcing means along at least some of the edges thereof.

5. A method as claimed in claim 1, in which said cross seams are disposed in adjacent parallel pairs for the reception and retention of a tube between a said adjacent pair.

References Cited

UNITED STATES PATENTS

| | | | |
|---|---|---|---|
| 2,376,256 | 5/1945 | Karlson | 53—29 |
| 2,759,648 | 8/1956 | Piazze | 53—29 |

TRAVIS S. McGEHEE, Primary Examiner